(No Model.)

W. A. LIST.
STOVE PIPE.

No. 381,021. Patented Apr. 10, 1888.

WITNESSES:
R. H. Whittlesey
F. E. Gaither.

INVENTOR,
William A. List
by Darwin S. Wolcott
Att'y.

UNITED STATES PATENT OFFICE.

WILLIAM A. LIST, OF WHEELING, WEST VIRGINIA.

STOVE-PIPE.

SPECIFICATION forming part of Letters Patent No. 381,021, dated April 10, 1888.

Application filed June 15, 1887. Serial No. 241,323. (No model.)

*To all whom it may concern:*

Be it known that I, WILLIAM A. LIST, residing at Wheeling, in the county of Ohio and State of West Virginia, a citizen of the United States, have invented or discovered certain new and useful Improvements in Stove-Pipes, of which improvements the following is a specification.

The invention herein relates to certain improvements in joints for stove-pipes, whereby sections of pipes may be packed in nests or bundles for shipment, and can then be easily put up without employing skilled labor.

Figure 1:
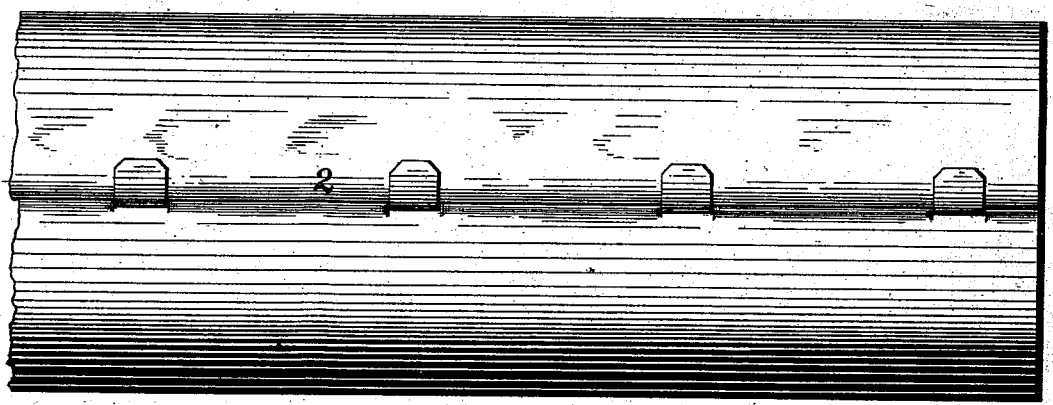
Figure 7:
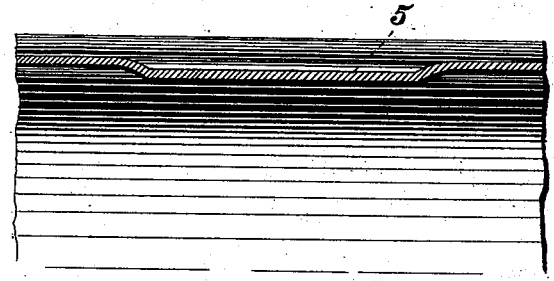

In the accompanying drawings, forming a part of this specification, Figure 1 is a view in elevation of a pipe-section embodying my invention. Figs. 2, 3, 4, 5, and 6 are sectional detail views showing modified forms of joint and lock. Fig. 7 is a sectional view of a portion of the section showing a countersink therein.

In the practice of my invention oppositely-bent hooks 1 and 2 are formed along the adjacent or meeting edges of the metal sheet, said hooks being constructed to engage each other, as shown in the several views, in such manner as to prevent enlargement or opening out of the cylinder or pipe-section, but can be readily disengaged by compressing the cylinder. In order to prevent the disengagement of the hooks when the pipe-section has been put into use, a series of cleats or locking-strips, 3, are secured along one edge of the sheet in such relation to the hook on that edge that when the cleats or strips are bent over the hook on the opposite edge the two hooks are tightly held in engagement with each other.

Figure 2:
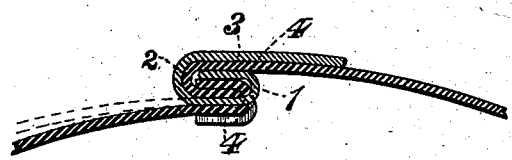

The cleat shown in Fig. 2 consists of a narrow strip of sheet metal having one end slit for a short distance, thereby forming prongs or fingers 4, which are thrust through a hole formed in the bend of the hook 1 and then bent around the outside of hook, either in the same or opposite directions, as shown. The cleat or strip being thus secured, the hook 2 is caused to engage the hook 1, and the free end of the strip is then bent over the hook 2, thus firmly locking the two hooks together.

Figure 3:
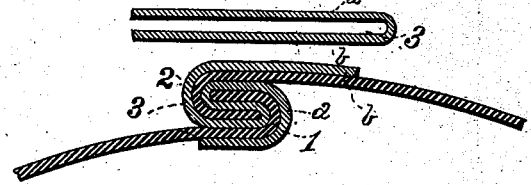

In the form shown in Fig. 3 a strip of sheet metal is doubled or bent on itself. The loop thus formed is pushed under the hook 1, and one part, as *a*, is then bent over the point or edge of the hook 1, thus securing the cleat in place. The hook 2 is then caused to engage the hook 1, the edge or point of the hook 2 entering between the two parts of the cleat. The part *b* is then bent over the hook 2, securing it in place.

Figure 4:
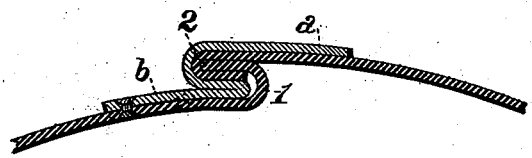

In Fig. 4 the strip is bent as in Fig. 2; but in lieu of securing the cleat in place by bending the part *a* over the hook 1 the part *b* is riveted to pipe-section. The hook 2 is then inserted between the hook 1 and the cleat and the part *a* bent over the hook 2.

Figure 5:
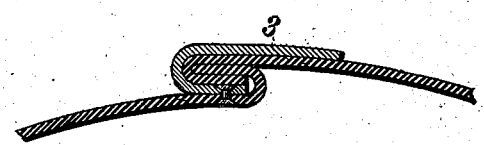

In Fig. 5 one end of the strip or cleat is riveted to the pipe-section within the hook 1 and the free end of the cleat bent over the hook 2 after the two hooks have been engaged.

Figure 6:
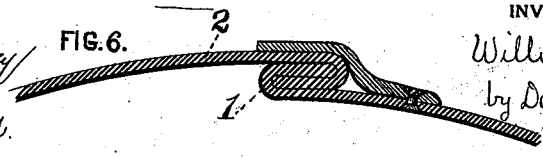

In the modification shown in Fig. 6 the cleat is riveted to the pipe outside of the point or edge of the hook 1, but in such proximity thereto that when bent down over the hook 2, as shown, the two hooks will be held in engagement.

In order to make a smooth joint on the outer surface of the pipe-sections, the sheet metal at the points where the cleats are applied is countersunk, as shown at 5, Fig. 7, for the reception of the hooks.

Pipe-sections constructed in accordance with my invention can be prepared ready for use, except the locking of the hooks, at the shop, and then shipped to the point of use in nests or bundles composed of a number of cylinders arranged one within the other. When required for use, the hooks 1 and 2 can be engaged and the cleats bent over, as described, thereby forming a complete pipe-section.

It will be observed that in the construction shown in Figs. 2 to 5. one end of the portion of the cleat operative in locking the hook 2 is located within the hook 1, and will therefore prevent any unlocking movement of the two hooks.

I claim herein as my invention—

A pipe-section having its adjacent or meeting edges provided with hooks 1 and 2, in combination with one or more cleats having one of their ends secured within the point or edge of one of the hooks and their free ends adapted to bend or fold over the other hook when the two hooks are in engagement with each other, substantially as set forth.

In testimony whereof I have hereunto set my hand.

WILLIAM A. LIST.

Witnesses:
HARDY HENRY,
H. KRUCKENBERG.